March 14, 1939.  W. D. COOK  2,150,542
FLOOD LIGHT SUPPORT
Filed March 30, 1937  2 Sheets-Sheet 1
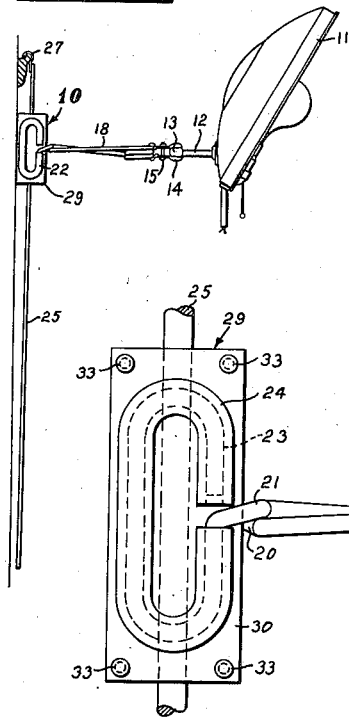
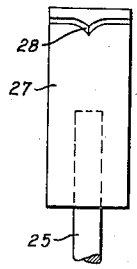
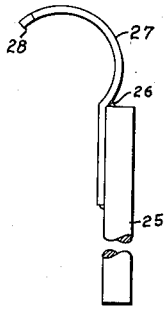
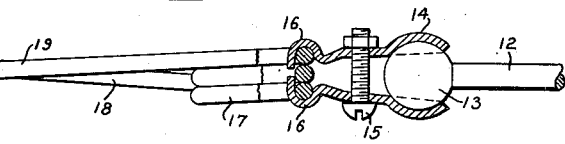
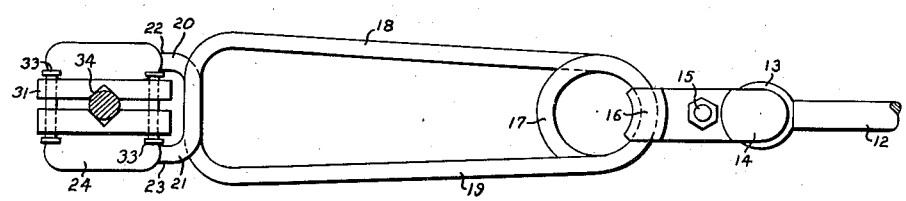
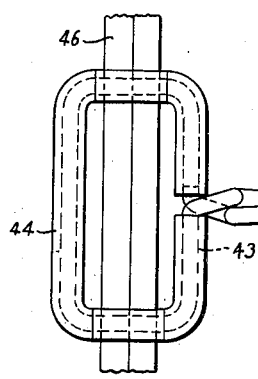
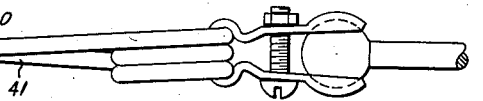
INVENTOR.
W. D. COOK
BY
B. J. Craig
ATTORNEY.

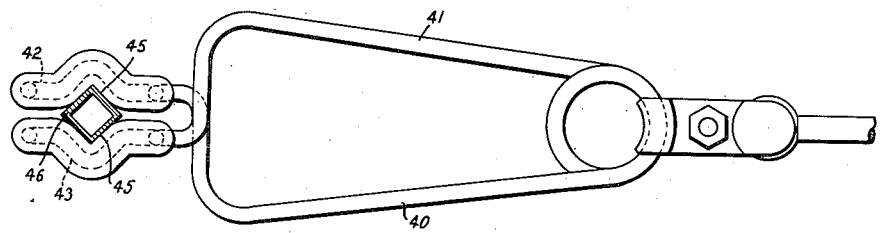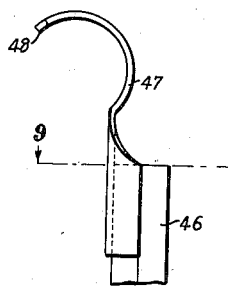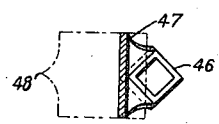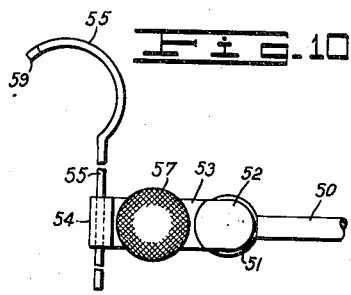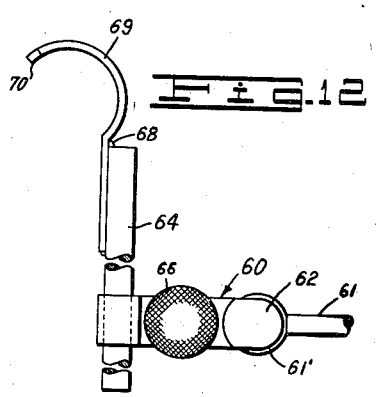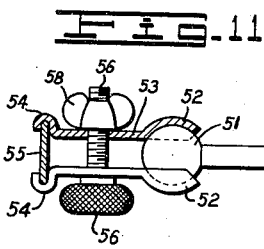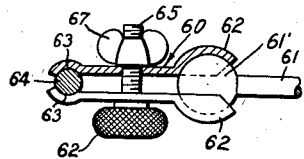

Patented Mar. 14, 1939

2,150,542

UNITED STATES PATENT OFFICE 2,150,542

FLOODLIGHT SUPPORT

Willis D. Cook, Marysville, Calif.

Application March 30, 1937, Serial No. 133,805

1 Claim. (Cl. 248—214)

This invention relates to an improvement in supports for floodlights.

The general object of the invention is to provide an improved attachment for adjustably securing a photo floodlight in proper place.

A more specific object of the invention is to provide a novel photo floodlight support including a bracket made of spring wire partly covered with a rubber protector and wherein novel means is provided for supporting the bracket.

A further object of the invention is to provide a novel hook member for supporting a floodlight.

An additional object of the invention is to provide a novel flood light support which may be readily adjustably secured to any projection such as a picture molding, door or window casing, etc.

Other objects and the advantages of my invention will be apparent from the following description taken in connection with the accompanying drawings, wherein:

Fig. 1 is a side elevation partly in section showing my improved flood light support with the flood light attached thereto;

Fig. 2 is a fragmentary top plan view partly in section showing the support;

Fig. 3 is a side elevation of the support;

Fig. 4 is a side elevation of the hook member;

Fig. 5 is a rear elevation of the hook member;

Fig. 6 is a top plan view of a modified support;

Fig. 7 is a side elevation showing the modified support;

Fig. 8 is a side elevation of the modified hook member;

Fig. 9 is a section taken on line 9—9 of Fig. 8;

Fig. 10 is a side elevation showing a modified form of support;

Fig. 11 is a plan view, partly in section, showing the support of Fig. 10;

Fig. 12 is a view similar to Fig. 10 showing a still further modification; and

Fig. 13 is a view similar to Fig. 11 showing the further modification.

Due to the development of fast panchromatic film amateur photographers have been stimulated to increased activity in indoor photography. Indoor photography requires the use of a temporary portable light source which is provided with suitable reflectors and prior to my invention the general practice has been to employ spring clamps for reflectors which attach to tripods or similar devices. This construction is bulky and is limited in its use. I have invented a flood light support which overcomes the former objections and in the accompanying drawings I have shown one embodiment of my invention which is indicated generally at 10.

According to my invention I provide a reflector 11 which has a post thereon. The post is provided with a ball 13 which is engaged by a socket member 14 which consists of two parts to provide a universal joint. A screw 15 serves to bring the two parts of the socket member 14 together and to hold loops 16 on these parts in engagement with the coils of a clamp member 17. The coils of the clamp member are here shown as three in number but this number may be varied. The coils include arms 18 and 19 which at their ends 20 and 21 remote from the coil 17 include clamping loops 22 and 23. These clamping loops 22 and 23 are preferably covered with a rubber tube 24 as shown in the drawings.

My supporting member as shown at 25 includes an elongated cylindrical rod or bar which at its upper end has welded thereto as at 26 a flat metal member 27 which is curved and is provided with an end spur 28 as shown in Figs. 4 and 5.

Slidably mounted on the rod 25 I show a clamping plate which is indicated generally at 29. As shown this plate includes two members 30 and 31 which are connected for limited movement towards and from each other by pins 33 which have suitable heads thereon. The members 30 and 31 of the clamping plate 29 are provided with opposed V notches 34 in which the rod 25 is fitted.

In use the clamping plate is positioned on the rod 25 then the jaws 22 and 23 of the clamping member are slid apart by pressing on the arms 18 and 19 against the tension of the coil spring 17 and the clamping member jaws are engaged upon the clamping plate thus bringing the portions 30 and 31 together and holding the clamping member in position.

The hook member 28 is engaged on a door, window, picture molding, or other suitable support. By pressing the arms 18 and 19 the clamping member may be moved along the rod 25 to its proper place. The post 12 may also be shifted to position so that the reflector 11 will function in the correct manner.

In Figs. 6 and 7 I show a construction similar to that shown in Figs. 1 to 5. In this modification arms 40 and 41 which constitute clamping members which have jaws 42 and 43 integral therewith. These jaws 42 and 43 are provided with a rubber tube 44 and the jaws are bent to form opposed recesses 45 which are shaped so that they may engage on a hollow rectangular tube 46 to hold the flood light in adjusted position. The tube 46 is shown as provided with an attaching member 47 which is provided with a pointed portion 48.

In Figs. 10 and 11 I have shown a modification of my invention wherein a post 50 includes a ball 51 thereon. The post 50 is adapted to be secured to a reflector (not shown) while the ball member 51 is engaged by socket members 52 which are on a clamp 53. On the clamp 53 at the end remote from the ball 51 the clamp is provided with opposed grooves 54 which engage a bar 55. A screw 56 which may include a knurled head 57 and a wing nut 58 serves to hold the clamp 53 on the ball and also to hold the bar 55 tightly in engagement with the grooves 54. The upper end of the bar 55 is preferably curved and pointed as at 59 (see Fig. 10.)

In Figs. 12 and 13 the clamp 60 includes a post 61 for attachment to a reflector. The post has a ball 61' thereon which is engaged by socket members 62 which have grooved portions 63 which engage a round rod 64. A screw 65 having a knurled edge 66 and a wing nut 67 serves to adjustably retain the parts in position. The upper end of the rod 64 has welded thereto as at 68 a curved bar 69 which is provided with a pointed end 70.

From the foregoing description it will be apparent that I have invented a novel portable flood light support which is simple in operation, is economical to manufacture, and which furnishes a most satisfactory support for a flood light.

Having thus described my invention I claim:

In a flood light support, a post, a ball on said post, a pair of spaced socket members universally mounted on said ball, a clamping member made of a single length of wire and including a coiled loop, said socket member engaging said loop, said clamping member including a pair of spaced arms, each of said arms terminating in a clamping portion, said clamping portion including parallel side portions, a pair of clamping plates, means to mount said plates for movement towards and from each other, said plates having parallel outer sides, said clamping portions engaging said parallel outer sides to urge said clamping plates towards each other, said clamping plates having V-shaped notches therein, said notches being opposed, a round bar fitted in said V-shaped notches, said bar having a hooked portion on one end thereof.

WILLIS D. COOK.